US009299189B1

(12) United States Patent
Chater et al.

(10) Patent No.: US 9,299,189 B1
(45) Date of Patent: Mar. 29, 2016

(54) TECHNIQUES FOR UPDATING DESIGN FILE LIGHTING VALUES (71) Applicant: Bentley Systems, Incorporated, Exton, PA (US)

(72) Inventors: Paul L. Chater, Harpenden (GB); Jerry D. Flynn, Spring City, PA (US)

(73) Assignee: Bentley Systems, Incorporated, Exton, PA (US)

(*) Notice: Subject to any disclaimer, the term of this patent is extended or adjusted under 35 U.S.C. 154(b) by 306 days.

(21) Appl. No.: 13/790,745

(22) Filed: Mar. 8, 2013

(51) Int. Cl.
*G06T 15/50* (2011.01)
*G06K 9/46* (2006.01)

(52) U.S. Cl.
CPC ............ *G06T 15/503* (2013.01); *G06T 15/506* (2013.01); *G06K 9/4647* (2013.01); *G06T 15/50* (2013.01)

(58) Field of Classification Search
None
See application file for complete search history.

(56) References Cited

U.S. PATENT DOCUMENTS

| 5,886,704 | A  | * | 3/1999 | Kang et al. ................. 345/426 |
| 8,217,940 | B2 |   | 7/2012 | Burley et al. |
| 8,346,376 | B2 |   | 1/2013 | Engelen et al. |
| 2003/0117412 | A1 | * | 6/2003 | Brooksby et al. ............. 345/589 |
| 2009/0027391 | A1 | * | 1/2009 | Burley et al. ................. 345/426 |
| 2010/0259197 | A1 |   | 10/2010 | Boleko Ribas |
| 2010/0283393 | A1 |   | 11/2010 | Boleko Ribas |
| 2010/0290697 | A1 | * | 11/2010 | Benitez ................... G06T 15/50 382/154 |
| 2011/0075890 | A1 | * | 3/2011 | Yasuda et al. ................ 382/112 |
| 2011/0273369 | A1 | * | 11/2011 | Imai et al. .................... 345/158 |
| 2013/0128073 | A1 | * | 5/2013 | Seok et al. ................. 348/223.1 |

OTHER PUBLICATIONS

"Composite: Composite User Guide," Autodesk, Inc. Mar. 11, 2010, pp. 1-916.
"COLIMO Features," Motiva CGArt & Technology, <http://www.motivacg.com/en/colimo/features/>, retrieved on Mar. 7, 2013, pp. 1.
Williams, Craig, "Multilight," Maxwell Render Multilight Documentation, Becker Morgan Group, Inc., <Http://support.nextlimit.com/display/maxwelldocs/Multilight>, Feb. 12, 2013, pp. 1-8.

* cited by examiner

*Primary Examiner* — Xiao Wu
*Assistant Examiner* — Steven Elbinger
(74) *Attorney, Agent, or Firm* — Cesari and McKenna, LLP; James A. Blanchette (57) ABSTRACT

In one embodiment, a stack of individual images of a scene are created. Each individual image corresponds to a respective light source or light source group associated with the scene. The individual images are combined to produce a combined image. The combined image is displayed. In response to user input indicating adjustments to a light source or light source group, an operator is applied to a corresponding individual image of the stack of individual images. An updated combined image is displayed on the display screen. Values for light sources or light source groups are generated based on the applied operator. The generated values are provided to a design session in a modeling environment.

20 Claims, 11 Drawing Sheets

TECHNIQUES FOR UPDATING DESIGN FILE LIGHTING VALUES

BACKGROUND

1. Technical Field

The present disclosure relates generally to computer-aided design, and more specifically to adjusting values for light sources used, for example, in producing a rendered image of a design of a structure.

2. Background Information

As part of a design of a structure, it is often desirable to create one or more rendered images to help visualize the structure's appearance and, in some cases, its relationship with the surrounding environment. The structure may be represented as a model that is manipulated in a design session in a modeling environment, and stored in a file, for example a design file. To visualize the structure's appearance, the user may define a scene that includes at least a portion of the structure, for example, by placing a virtual camera with respect to the model to define the scene. To render the scene, the user exports data relevant to the camera's position from the design session to a rendering engine, which uses the data to produce a rendered image of the scene. This rendered image may be substantially photorealistic, or stylized in some manner.

Lighting generally has a dramatic effect on the rendered image produced. The exported data typically includes values (e.g., brightness, color temperature, etc.) for a number of light sources located within the scene, as well as located outside of the scene but capable of projecting light into the scene (collectively, light sources associated with the scene). These light sources may include light fixtures, solar lighting, and various types of environmental lighting, etc. In addition to the mere presence or absence of light from each of these light source, balance between the values (e.g., brightness, color temperature, etc.) of each light source is important.

In order to create a rendered image with a desired appearance, significant care is often taken to balance the values for the light sources. Typically, an iterative approach is employed. A user adjusts a value within the design session in the modeling environment, exports data from the design session to the rendering engine to render the scene, observes the rendered image, then adjusts a value within the design session, exports the data again, observes the rendered image, etc. This process is repeated over and over, until an acceptable rendered image is obtained. While this process may eventually yield a rendered image with the desired appearance, or something close to the desired appearance, it can be time consuming and frustrating. Each time the user updates a value within the design session, he or she typically does so "blind", i.e., with no immediate visual feedback. Only when the scene is later rendered is the effect of the adjustment seen. As a result, it can take a significant number of attempts, and thereby a significant amount of time, to narrow in upon values that produce something close to the desired appearance. The number of attempts and amount of time grows in relation to the complexity of the scene and the number of light sources.

Accordingly, there is a need for improved techniques that may address these and other shortcomings.

SUMMARY

In one embodiment, an effects manager allows a user to balance values for light sources associated with a scene by manipulating a stack of low-resolution individual images, where each individual image corresponds to a light source or a light source group. Information, including brightness and color values, is imported into the effects manager from a design session in a modeling environment. For each light source or light source group, the effects manager renders a low-resolution individual image with only the respective light source or light source group illuminated. In each low-resolution individual image, the color of the respective light source or light source group is set to pure white. The low-resolution individual images form a stack and are combined using an additive operator, to produce a low-resolution combined image. The low-resolution combined image is tone mapped and displayed on a display screen. There user may adjust lighting balance by adjusting light sources and/or light source groups. Each adjustment may be made by applying an operator to a respective low-resolution individual image (e.g., representing a change the brightness, color temperature, etc. of a corresponding light source or light source group). After the operator is applied, the low-resolution individual images of the stack are again combined, and the resulting low-resolution combined image tone mapped, and displayed, to provide the user with rapid visual feedback. The low-resolution individual images of the stack need not be re-rendered each time a change is made, allowing the display to be nearly instantaneous.

Once a desired appearance is achieved, the effects manager may use the operators applied to the low-resolution individual images to generate updated values for the light sources and light source groups based on the originally imported values. These values may be pushed back to the design session in the modeling environment and used in the design session for a variety of purposes. Among other things, the values may eventually be exported from the design session to a rendering engine to create one or more high-resolution rendered images that having lighting that is substantially similar to the low-resolution combined image displayed by the effects manager.

It should be understood that a variety of other embodiments may be implemented, including other embodiments discussed below, and variations and refinements thereof. This Summary is intended simply as an introduction to the reader, and does not indicate or imply that the techniques mentioned herein are necessary, or essential, to the invention.

BRIEF DESCRIPTION OF THE DRAWINGS

The description below refers to the accompanying drawings of example embodiments, of which.

DETAILED DESCRIPTION

Figure 1:
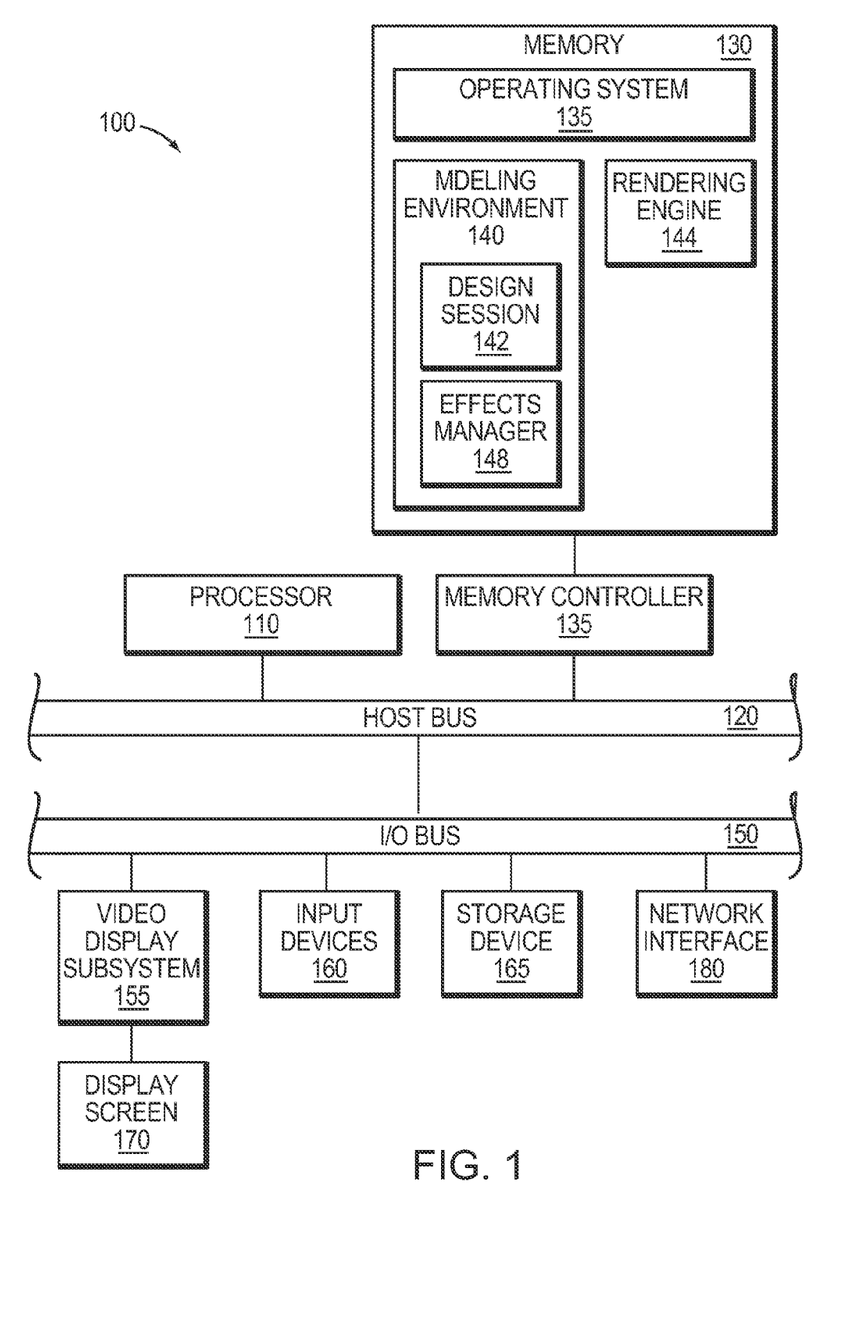
FIG. 1 is a block diagram of an example electronic device that may be used with the present techniques.

FIG. 1 is a block diagram of an example electronic device 100 that may be used with the present techniques. The electronic device 100 may be a designed for stationary operation (e.g., may be a desktop computer), or may be portable electronic device (e.g., a notebook computer, a tablet computer, a smartphone, etc.). The electronic device 100 includes at least one processor 110 coupled to a host bus 120. The processor 110 may be any of a variety of commercially available processors, such as an Intel x86 processor, or another type of processor. A volatile memory 130, such as a Random Access Memory (RAM), is coupled to the host bus 120 via a memory controller 525.

The memory 130 is configured to store at least a portion of computer-executable instructions and data for an operating system (OS) 135 while the electronic device 100 is operating. In addition, the memory 130 may be configured to store at least a portion of computer-executable instructions and data for a modeling environment 140 used to create and/or maintain a model of a structure. As used herein, the term "structure" refers to an entity constructed of a plurality of parts, interconnected in a defined arrangement. A structure may be a building, a bridge, a civil construction, a plant, a vehicle, a machine, or some other type of entity. The modeling environment 140 may be the MicroStation® environment available from Bentley Systems Inc., or another type of modeling environment provided by another vendor. The model of the structure may be used in a design session 142 within the modeling environment 140, which allows manipulation of elements of the model. Information relating to the design session 142 may be maintained in a file, for example, a design file formatted according to the MicroStation® DGN standard, or a file formatted according to another standard.

A rendering engine 144 may be provided that is capable of creating high-resolution images of a scene. As used herein, the term "high-resolution" refers to a pixel resolution greater than 1280×720. The rendering engine may the Luxology® rendering engine available from Luxology, LLC, or another rendering engine available from another vendor. In one implementation, the rendering engine 144 is located external to the modeling environment 140 and information relevant to the scene is exported from the design session 142 within the modeling environment 140 to the rendering engine 144. Alternatively, the rendering engine 144 may be located internal to the modeling environment 140, and more directly access the information.

In one embodiment, an effects manager 148 is provided that allows a user to manipulate lighting values for light sources or light source groups associated with the scene. As part of its operation, the effects manager 148 may generate a stack of low-resolution individual images of the scene. As used herein, the term "low-resolution" refers to a pixel resolution equal to or less than 1280×720. Further details regarding operation of the effects manager 148 are provided below.

The host bus 120 of the electronic device 100 is coupled to an input/output (I/O) bus 150 through a bus controller 145. A video display subsystem 155 may include a discs play screen 170 and hardware to drive the display screen. The video display subsystem 155 is coupled to the I/O bus 150. The display screen 170, among other functions, may show a graphical user interface (GUI) of the modeling environment 140, rendering engine 144 and effects manager 148. One or more input devices 160, such as a keyboard, touch sensor, touchpad, mouse, etc., are provided and used by a user to interact with the electronic device 100. A persistent storage device 165, such as a hard disk drive, a solid-state drive, or other type or persistent data store, is coupled to the I/O bus 150, and may persistently store computer-executable instructions and data, that are available to be loaded into the volatile memory 130 when needed. For example, computer-executable instructions and data for the operating system 135, the modeling environment 140, the rendering engine 144 and the effects manager 148 may be stored in the persistent storage device 165. The I/O bus 150 may further be coupled to a network interface 180 that interfaces with a computer network, such as the Internet. The computer network may allow communication between the electronic device 100 and other devices, using any of a number of well known networking protocols. Such communication may enable a number of collaborative, distributed, and remote computing arrangements.

As discussed above, when the rendering engine 144 renders a scene, lighting generally has a dramatic effect on the rendered image produced. In order to create a rendered image with a desired appearance, values (e.g., brightness, color temperature, etc.) for light sources associated with the scene (i.e. light sources located within the scene, as well as light sources located outside of the scene but capable of projecting light into the scene) need to be balanced.

In one embodiment, the effects manager 148 allows a user to balance values for light sources associated with a scene by manipulating a stack of low-resolution individual images, where each low-resolution individual image corresponds to a light source or a light source group. Information is imported into the effects manager 148 from the design session 142 of the modeling environment 140. The imported information may include real world brightness values (e.g., expressed in lumens) and color values for light sources and light source groups associated with a scene that depicts at least a portion of a structure. For each light source or light source group, the effects manager 148 renders a low-resolution individual image with only the respective light source or light source group illuminated. In each low-resolution individual image, the color of the respective light source or light source group is set to pure white. The low-resolution individual images form a stack and are combined using an additive operator, to produce a low-resolution combined image. The low-resolution combined image is tone mapped and displayed on the display screen 170. There user may adjust lighting balance by adjusting a light source or light source group. Such adjustment may be made by applying an operator to a respective low-resolution individual image (e.g., representing a change the brightness, color temperature, etc. of a corresponding light source or light source group). After the operator is applied, the low-resolution individual images of the stack are again combined, and the resulting low-resolution combined image tone mapped, and displayed, to provide the user with rapid visual feedback. The low-resolution individual images of the stack need not be re-rendered each time a change is made.

Once a desired appearance is achieved, the effects manager 148 uses the operators applied to the low-resolution images of the stack to generate values for the light sources or light source groups. For example, scalars may be applied to the real world brightness values and color values originally imported to the effects manager to produce adjusted values. These values are pushed back to the design session 142 in the modeling environment 140. The values may be used in the design session 142 for a variety of purposes. Among other things, the values may eventually be exported from the design session 142 to the rendering engine 144 to create one or more high-resolution rendered images that having lighting that is substantially similar to the low-resolution combined image displayed by the effects manager 148.

Figure 2A:
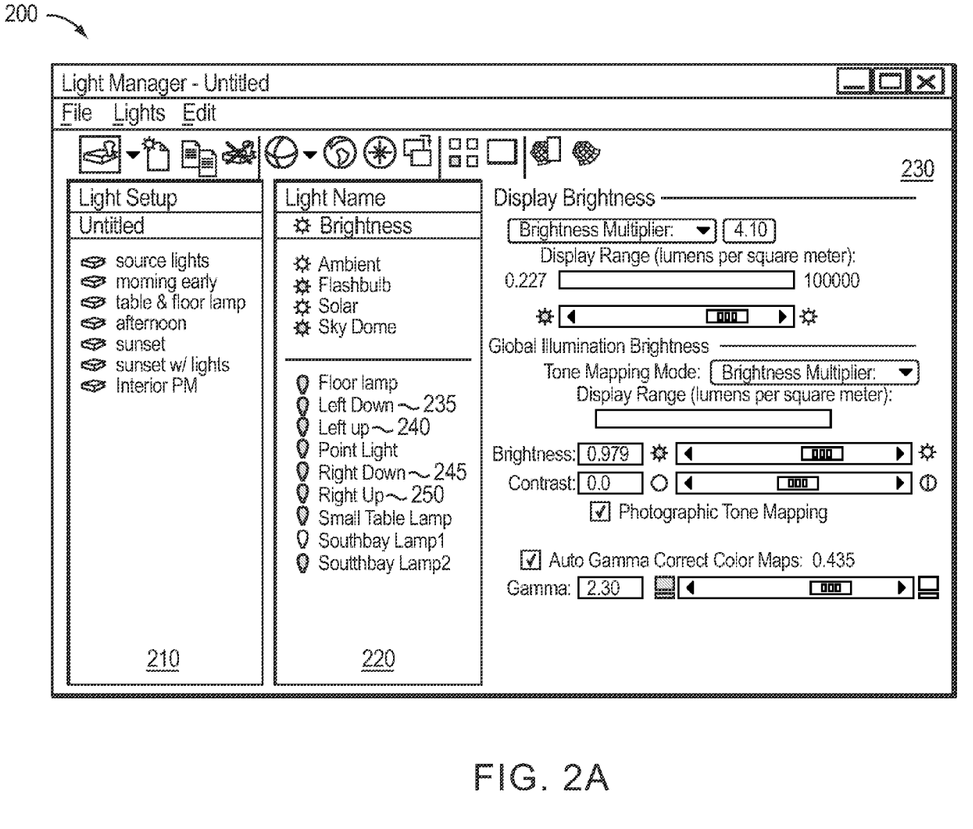
FIG. 2A is a screen shot of an example user interface for a light manager tool that may be used to define light sources.

Such an embodiment may be examined in more detail. Within the modeling environment 140, a camera setup tool is provided that allows a user to place a virtual camera with respect to a model of a structure. Placement of the virtual camera may define a scene. Further, a light manger tool is provided that allows a user to define light sources associated with the scene. FIG. 2A is a screen shot 200 of an example user interface of a light manager tool that may be used to define light sources. A number of different lighting configurations (i.e., light setups) may be created and listed in a light setup field 210. Each light setup may include a plurality of light sources, including light fixtures, solar lighting, and various types of environmental lighting, such as visible and indirect environmental lighting. Each light source may be listed in a light name list 220. Upon selection of a light source in the light name list, settings are displayed in a dialog pane 230 for editing.

Certain of the light sources may be related to light fixtures that are typically controlled together. For example, looking to the specifically-named light sources in the light name list 220, the light sources named "left down" 235, "left up" 240, "right down" 245, and "right up" 250 may be spot lights of a pair of wall sconces (e.g., left and right), that shed light in certain directions (e.g., up and down). Light sources that are typically controlled together may be assigned to light source groups for use in later operations.

Figure 2B:
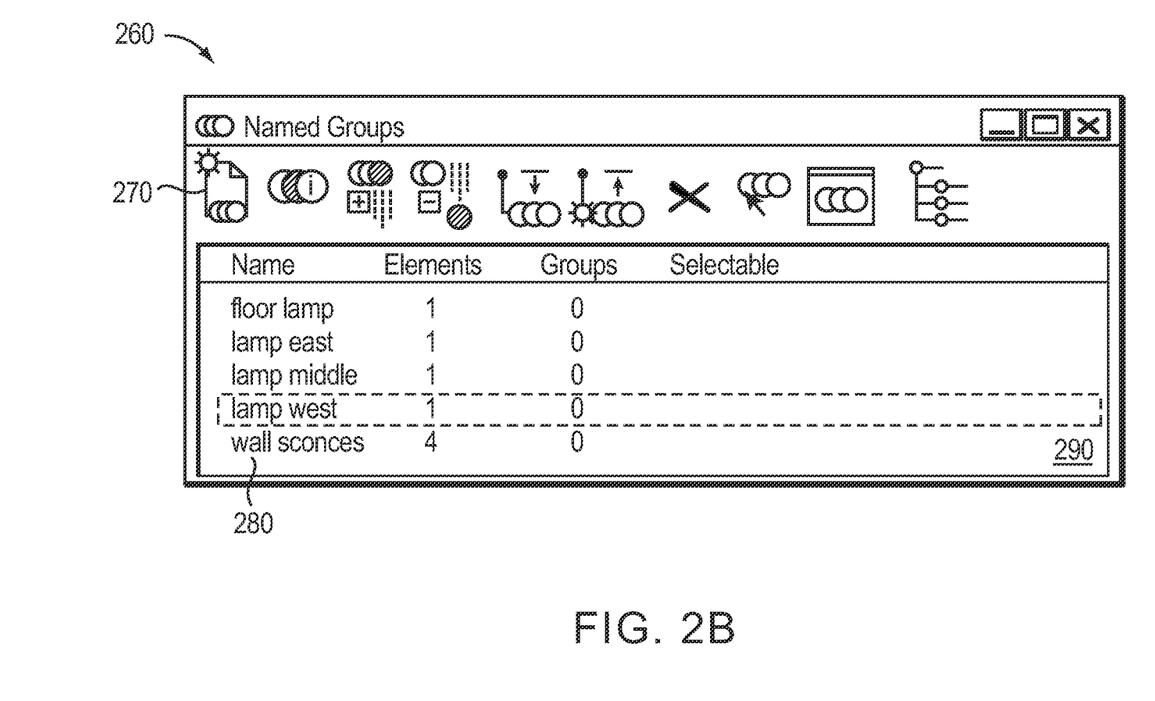
FIG. 2B is a screen shot of an example user interface of a named groups utility that may be used to group certain light sources into light source groups.

FIG. 2B is a screen shot 260 of an example user interface of a named groups utility that may be used to group certain light sources into light source groups. An interface element 270 is provided for creating a new light source group. Additionally, interface elements are provided for populating the light source groups with one or more light sources from the light name list 220. For example, referring back to the above mentioned example of a pair of wall sconces, the light sources named "left down" 235, "left up" 240, "right down" 245, and "right up" 250 may be represented by a light source group "wall sconces" 280, where the four individual light sources are treated collectively. A group names list 290 is provided listing the created light source groups, for example, including the light source group "wall sconces" 280.

When activated, for each light source or light source group associated with the scene, the effects manager 148 renders a low-resolution individual image of the scene with only the respective light source or light source group illuminated, and with a light color for the respective light source or light source group set to pure white. The rendering may be performed by a rendering routine internal to the effects manager 148 that is optimized for rapid low-resolution rendering, or by an external routine. As a result of such renderings, a stack of low-resolution individual images is created whose number is equal to the number of light sources and light source groups. For example, if there are eight light sources or light source groups, the effects manager 148 may render a stack of eight low-resolution individual images.

In one embodiment, each low-resolution individual image of the stack may take the form of a red-green-blue (RGB) floating point image, where each pixel of the image has RGB color components that are represented as floating point values (as opposed to integer values). The use of floating point values may provide a more accurate representation of incident illumination on surfaces in the scene from individual light sources or light source groups than possible using integer values, given their greater range.

Figure 3:
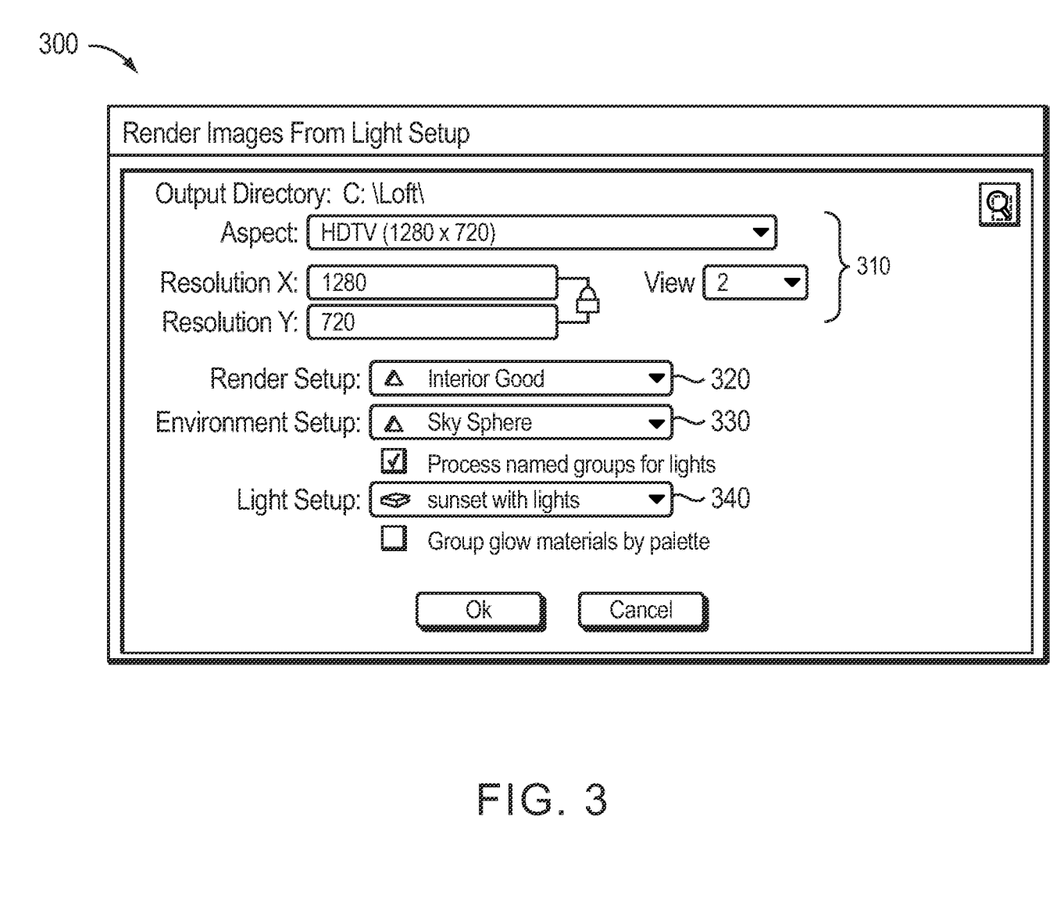
FIG. 3 is a screen shot of an example dialog box of an example effects manager that may be used to render a stack of low-resolution individual images of a scene.

FIG. 3 is a screen shot 300 of an example dialog box of the effects manager 144 that may be used to render a stack of low-resolution individual images of the scene, where each low-resolution individual image corresponds to a respective light source or light source group. A first set of interface elements 310 is provided for selecting the resolution. Further interface elements 320, 330 are provided for selecting predefined render settings and environment settings that are used to create the low-resolution individual images. Still further interface elements 340 are provided for selecting the light sources and light source groups for which the low-resolution individual images are to correspond, using definitions previously entered in the light source manager.

FIGS. 4-8 are screen shots 400, 500, 600, 700, 800 of an example main user interface of the effects manager 144, depicting a progression for balancing lighting values. The main user interface includes both an image list 410 for the stack of low-resolution images and a preview window 420. The low-resolution individual images in the image list 410 may have specific names, for example, corresponding to the specific names of corresponding light sources in the light name list 220 and light source groups in the group name list 270. For example, a "wall sconces" image 430 in the image list 410 may correspond to the "wall sconces" light source group 280 in the group name list 290. The preview window 420 shows a combination of the low-resolution individual images of the stack. The effects manager 144 combines the low-resolution individual images of the stack using an additive operator (e.g., sums pixels values of corresponding pixels of each of the low-resolution individual images) to produce a low-resolution combined image. Since the low-resolution individual images may be floating point images, where the color components of each pixel are represented by floating point values, the resulting low-resolution combined image may also be a floating point image. As such, the combined image may have a dynamic range that is greater than the display screen 170. To permit display in the preview window 420 the low-resolution combined image may be tone mapped to accommodate the more limited dynamic range of the display screen 170.

The user may adjust lighting balance by adjusting a light source or light source group. Such adjustment is made by applying an operator to a respective individual low-resolution image (e.g., to represent turning the light source or light source group on or off, changing its brightness, changing its color temperature, etc.). The user may select the light source or light source group by picking the corresponding individual low-resolution image from the image list 410. The user may then indicate the desired change via the controls 440. In response to input on the controls 440, the effects manager 148 determines an appropriate operator and applies it to the respective low-resolution individual image of the stack of images. For example, an operator for adjusting brightness may involve multiplication of the color components (e.g., RGB components) of each pixel by a constant scaling factor (i.e., the same scaling factor for each color component of a pixel). Similarly, an operator for adjusting color temperature may involve multiplication of the color components (e.g., RGB components) of each pixel by a different scaling factor (i.e., one scaling factor for a first color component of a pixel, a second scaling factor for a second color component of the pixel, etc.) Turing a light source or light source group "on" or "off" may be implemented as a boundary case of adjusting the brightness.

Figure 4:
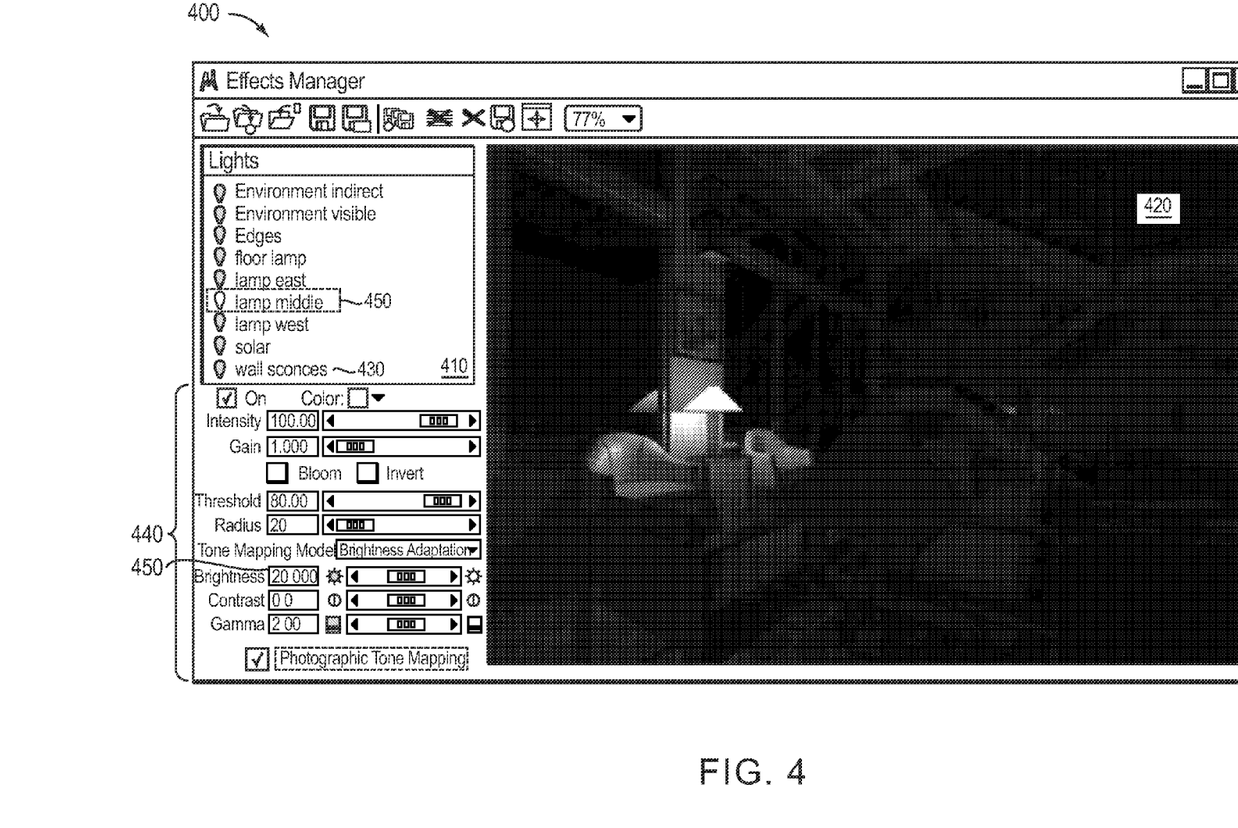
FIGS. 4-8 are screen shots of an example main user interface of the effects manager, depicting a progression for balancing lighting values.
Figure 5:
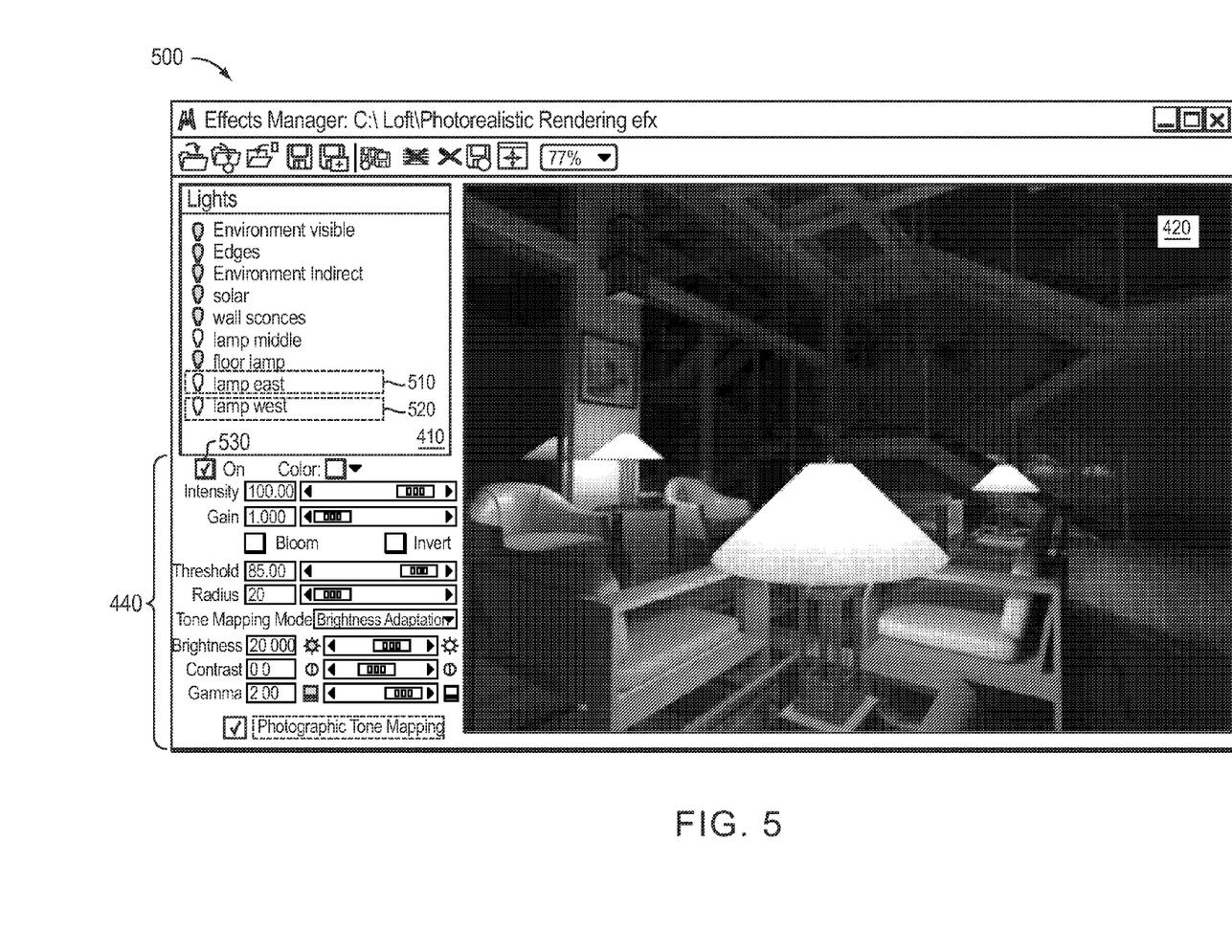
Figure 6:
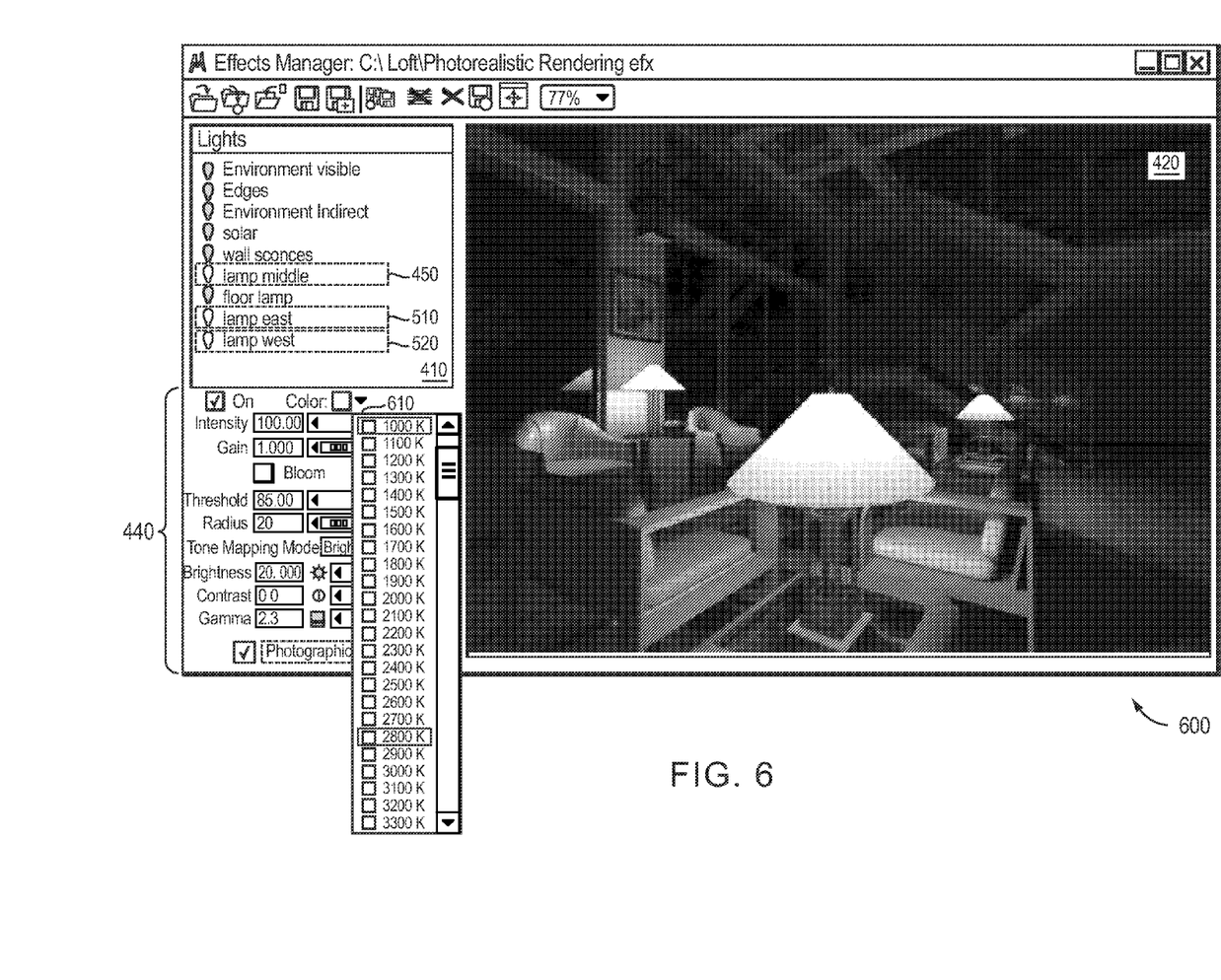

For example, referring to FIG. 4, in response to a user deciding to change brightness of a light source named "lamp middle", the user may select the corresponding "lamp middle" individual low-resolution image 450 from the image list 410. The user may then indicate a brightness adjustment using brightness control 460 of the controls 440. The effects manager 148 multiples the color components (e.g., RGB components) of each pixel of the "lamp middle" low-resolution image 450 by a constant scaling factor corresponding to the indicated brightness.

By sequentially adjusting individual low-resolution images of the image stack, the user may balance lighting provided by the light sources and light source groups. Upon each adjustment, the effects manager 148 again combines the low-resolution individual images of the image stack, tone maps, and displays the resulting low-resolution combined image in the preview window 420, providing rapid visual feedback. Changes to a variety of light sources and light source groups may be strung together to achieve the desired lighting effect.

For example, after the change indicated in FIG. 4, a user may then turn on "lamp east" and "lamp west". Referring to the screen shot 500 in FIG. 5, the user selects the "lamp east" 510 and "lamp west" 520 low-resolution individual images from the image list 410 and uses an on/off control 530 of the controls 440. In response, the effects manager 148 multiplies the color components (e.g., RGB components) of each pixel of the "lamp east" image and "lamp west" image by a constant scaling factor to effect the change, again combines the low-resolution individual images of the stack, tone maps, and displays the resulting low-resolution combined image in the preview window 420.

A user may then adjust the color temperature of the "lamp middle", "lamp east" and "lamp west". Referring to the screen shot 600 in FIG. 6, the user selects the "lamp middle" 450, "lamp east" 510 and "lamp west" 520 images from the image list 410 and uses a color control 610. In response, the effects manager 148 multiplies the color components (e.g., RGB components) of each pixel of the "middle lamp" image, "lamp east" image and "lamp west" image by a different scaling factor to effect the change, again combines the individual low-resolution images of the stack, tone maps, and displays the resulting low-resolution combined image in the preview window 420.

Figure 7:
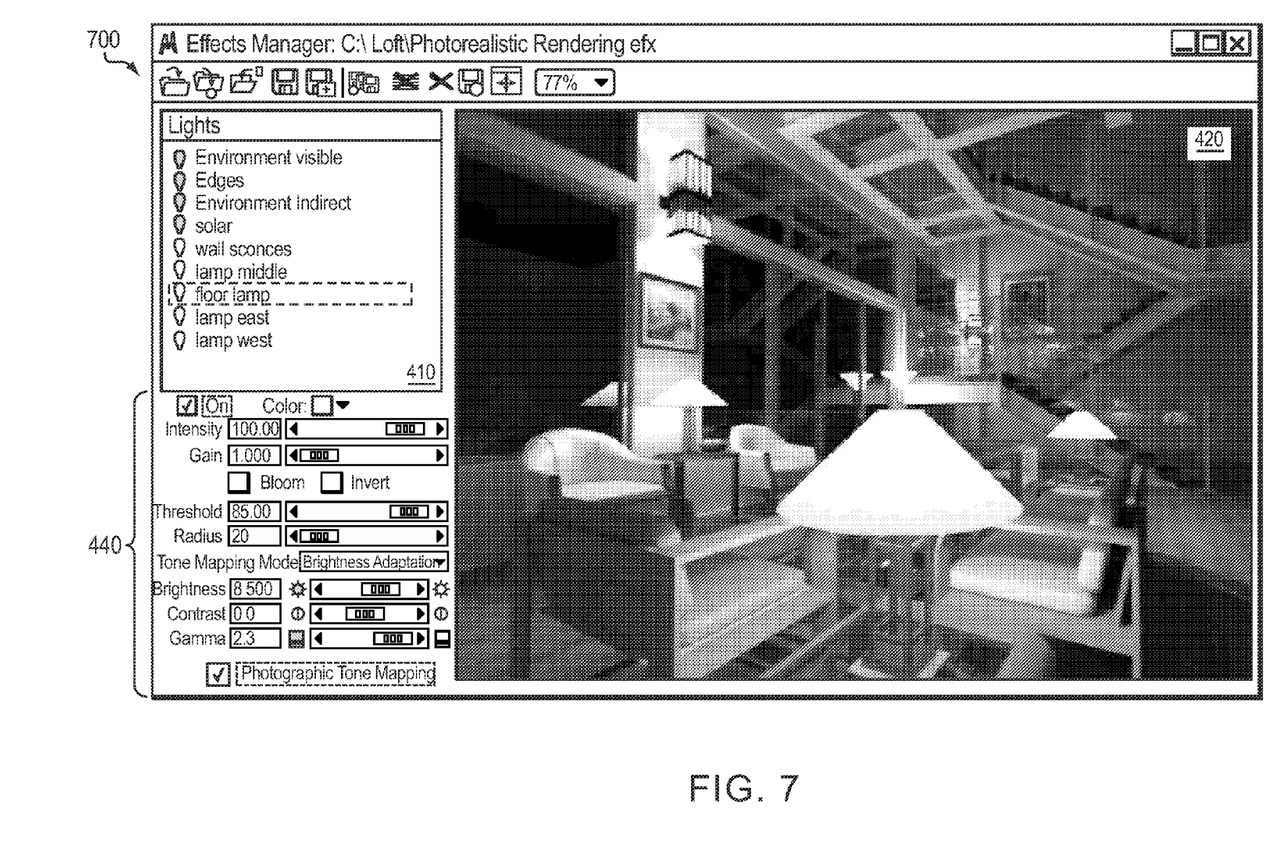
Figure 8:
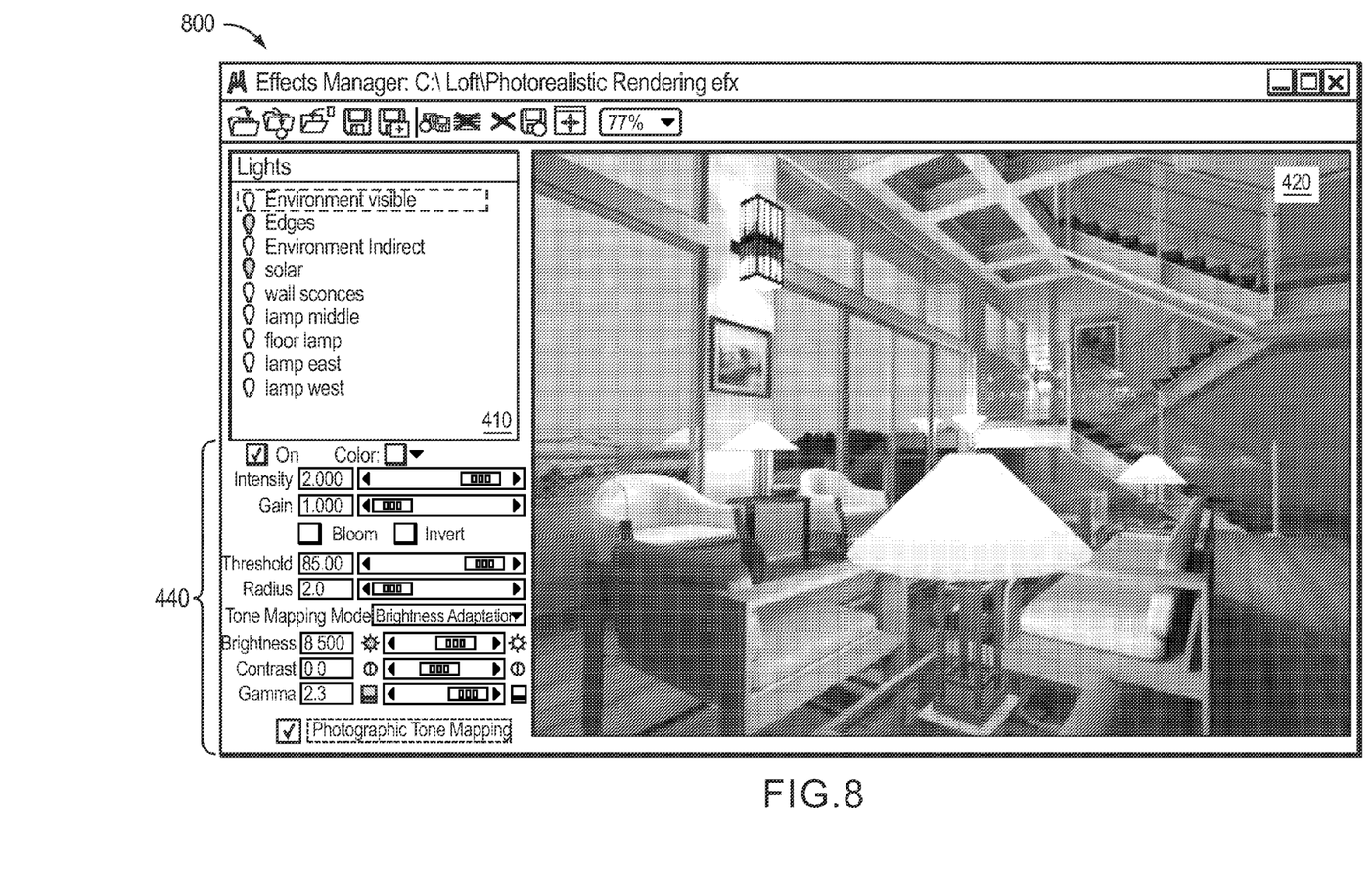

Using similar mechanisms, a "floor lamp" may be turned on and adjusted in connection with the screen shot 700 shown in FIG. 7, and environmental light sources may be turned on and adjusted in connection with the screen shot 800 shown in FIG. 8.

Through all these adjustments, the low-resolution individual images of the image stack need not re-rendered. Rather, operators are simply applied to the appropriate low-resolution individual images. Once a desired appearance is achieved in the preview window 420, the effects manager 148 uses the various operators applied to the low-resolution individual images to generate values for the light sources and light source groups. Such generation of values may involve scaling imported values for the light sources and light source groups.

For example, each light source or light source group typically has a brightness value corresponding to a real world brightness, for example expressed in lumens, that is used within the design session 142. The above-discussed constant scalars used to adjust brightness by the effects manger may be applied to this imported value to generate a value that represents real-world brightness for the light sources or light source groups. For example, if a light source has a brightness value of 1500 lumens in a constant scalar of 2.0 is used in the effects manager 144, the real-world brightness value may be updated to be 3000 lumens. Similarly, the above-discussed different scaling factors used to change the color temperature in the effects manager 144 may be used to produce a update an imported color value that represents real-world color temperature of the light sources or light source groups.

The effects manager 148 then pushes the values back to the design session 142 in the modeling environment 140. The values may be maintained in the design session 142 (for example, stored in the design file) and used for a variety of purposes. Among other things, the values may eventually be exported from the design session 142 to the rendering engine 144 to create one or more high-resolution rendered images. In such case, the values may define to the rendering engine 144 how the scene is illuminated. The high-resolution rendered images may be from the same camera position used with the effects manager 148, or from different camera positions.

Figure 9:
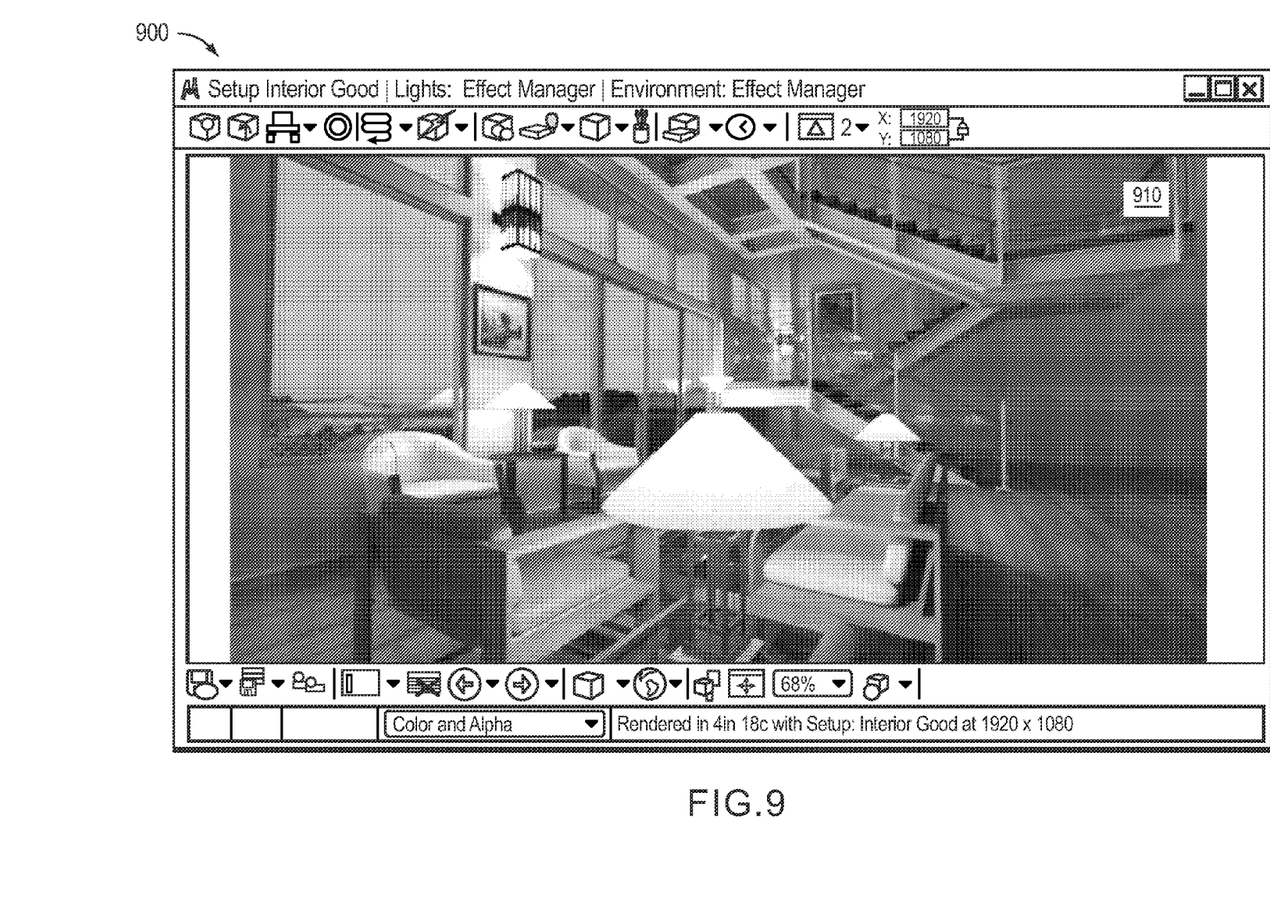
FIG. 9 is a screen shot of an example rendering window showing a high-resolution rendered image produced by a rendering engine.

FIG. 9 is a screen shot 900 of an example rendering window showing a high-resolution rendered image 910 produced by the rendering engine 144. With the exception of resolution, the high-resolution rendered image 910 may be substantially identical to the final low-resolution combined image shown in the preview window 420 of the effects manager, here in FIG. 8. While the high-resolution rendered image 910 happens to be from the same camera position used in effects manager 148, it should be understood that the camera position may be changed to produce a different view of the scene.

Figure 10:
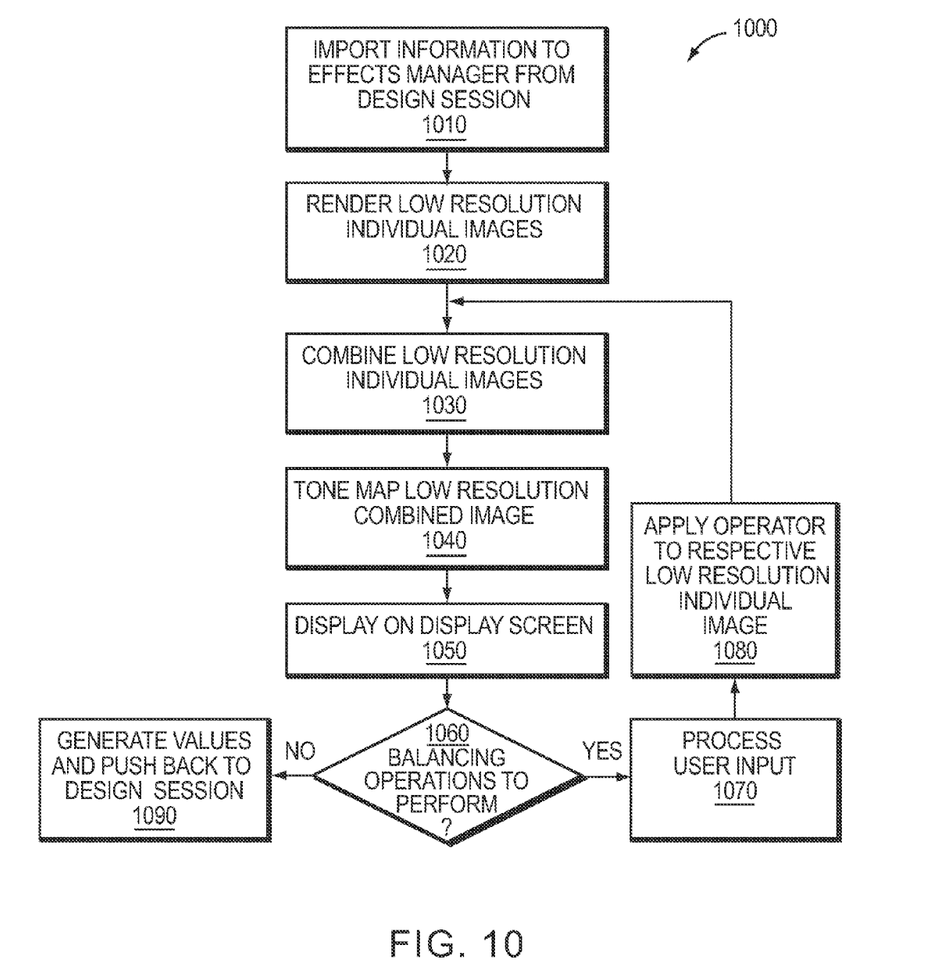
FIG. 10 is a flow diagram of an example sequence of steps that may be executed by the effects manager to allow a user to balance lighting values.

FIG. 10 is a flow diagram of an example sequence of steps 1000 that may be executed by the effects manager 148 to allow a user to balance values for light sources associated with a scene. It should be understood that a variety of additional steps may also be executed by the effects manager 148, and at least some of the steps may be executed in a differing order.

At step 1010, information is imported into the effects manager 148 from a design session 142 of a modeling environment 140. The imported information may include real world brightness values (e.g., expressed in lumens) and color values for light sources and light source groups associated with a scene that depicts at least a portion of a structure. At step 1020, for each light source or light source group, the effects manager 148 renders a low-resolution individual image of the scene with only the respective light source or light source group illuminated, and with a light color for the respective light source or light source group set to pure white, to produce a stack of individual images. At step 1030, the effects manager 148 combines low-resolution images of the image stack using an additive operator. At step 1040, the effects manager 148 tone maps the resulting low-resolution combined image to accommodate the dynamic range of a display screen 170. At step 1050, the effects manager 148 displays the low-resolution combined image on the display screen 170. At step 1060, a check is performed to determine whether there are balancing operations to be performed.

If there are balancing operations to be performed, at step 1070, user input is processed indicating a desired adjustment to a light source or light source group. At step 1080, the effects manager 148 applies an operator to a respective low-resolution individual image. Execution then loops back to step 1030. If, in step 1050, there are no balancing operations to be performed, execution proceeds to step 1090 where the effects manager 148 uses the various operators applied to the low-resolution individual images to generate values for the light sources and light source groups, for example by scaling or otherwise adjusting the real world brightness values (e.g., expressed in lumens) and color values originally imported to the effects manager 144, and pushes the updated values back to the design session 142 in the modeling application 140. The sequence of steps may then conclude.

In summary, the present disclosure describes techniques that allow a user to efficiently balance values for light sources associated with a scene. It should be understood that various adaptations and modifications may be readily made to the embodiments, to suit various implementations. Further, it should be understood that at least some of the above-described techniques may be implemented in software, in hardware, or a combination thereof. A software implementation may include computer-executable instructions stored in a non-transitory computer-readable medium, such as a volatile or persistent memory, a hard-disk, a compact disk (CD), or other storage medium. A hardware implementation may include specially configured processors, logic circuits, application specific integrated circuits, and/or other types of hardware components. Further, a combined software/hardware implementation may include both computer-executable instructions stored in a non-transitory computer-readable medium, as well as one or more hardware components, for example, processors. Accordingly, it should be understood that the above descriptions are meant to be taken only by way of example.

What is claimed is:

1. A method for balancing lighting values comprising:
    creating a stack of individual images of a scene, each individual image corresponding to a respective light source or light source group associated with the scene, each light source or light source group having an initial value;
    combining the individual images to produce a combined image;
    displaying the combined image on a display screen;
    in response to user input on an input device indicating adjustments to a light source or light source group, applying an operator to an individual image of the stack of individual images corresponding to the light source or light source group, wherein the operator multiplies color components of each pixel of the corresponding individual image by a scaling factor;
    displaying an updated combined image on the display screen;
    generating a value for the light source or light source group based on the applied operator by scaling the initial value of the light source or light source group by the scaling factor; and
    providing the generated value to a design session in a modeling environment executing on an electronic device.

2. The method of claim 1, further comprising:
    importing information for the scene from the design session, the information to include an imported value that serves as the initial value of the light source or light source group; and
    using the information in rendering the stack of individual images.

3. The method of claim 1, further comprising:
    tone mapping the combined image prior to display on the display screen.

4. The method of claim 1, wherein each individual image depicts only the corresponding light source or light source group as illuminated.

5. The method of claim 1, wherein each individual image is a floating point image.

6. The method of claim 1, wherein the adjustments to the light source or light source group include adjustments to brightness, and the operator multiplies color components of each pixel of the corresponding individual image by a constant scaling factor.

7. The method of claim 1, wherein the adjustments to the light source or light source group include adjustments to color temperature, and the operator multiplies color components of each pixel of the corresponding individual image by a different scaling factor.

8. The method of claim 1, further comprising:
    storing the generated value in the design session with a design file.

9. The method of claim 1, further comprising:
    exporting the generated value from the design session to a rendering engine to create one or more rendered images.

10. The method of claim 9, wherein the individual images are low-resolution individual images and the one or more rendered images are high-resolution rendered images.

11. An electronic device configured to balance lighting values comprising:
    a display screen;
    a processor configured to execute executable instructions;
    a memory configured to store executable instructions and data, the executable instructions and data including:
        a modeling environment configured to maintain a design session, the design session including a model of a structure, and
        an effects manager configured to:
            import information for a scene including at least a portion of the structure from the design session, the imported information to include an imported value for each of a plurality of light sources or light source groups,
            create a stack of individual images of the scene, each individual image corresponding to a respective light source or light source group associated with the scene,
            combine the individual images to produce a combined image,
            display the combined image on the display screen,
            apply an operator to an individual image of the stack of individual images corresponding to a light source or light source group, wherein the operator multiplies color components of each pixel of the corresponding individual image by a scaling factor,
            display an updated combined image on the display screen,
            generate a value for the light source or light source group based on the applied operator by scaling the imported value of the light source or light source group by the scaling factor, and
            provide the generated value for use in the design session.

12. The electronic device of claim 11, wherein the effects manager is further configured to tone map the combined image prior to display on the display screen.

13. The electronic device of claim 11, wherein each individual image depicts only the corresponding light source or light source group as illuminated.

14. The electronic device of claim 11, wherein each individual image is a floating point image.

15. The electronic device of claim 11, wherein the operator multiplies color components of each pixel of the corresponding individual image by a constant scaling factor.

16. The electronic device of claim 11, wherein the operator multiplies color components of each pixel of the corresponding individual image by a different scaling factor.

17. The electronic device of claim 11, wherein the modeling environment maintains the design session with a design file.

18. The electronic device of claim 11, wherein the modeling environment is further configured to export the generated value from the design session to a rendering engine to create one or more rendered images.

19. A non-transitory computer-readable medium containing executable instructions, the instructions, when executed by one or more processors, operable to:
- maintain a stack of individual images of a scene, each individual image depicting a single light source or light source group illuminated;
- in response to user input indicating adjustments to a light source or light source group, apply an operator to an individual image of the stack of individual images corresponding to a light source or light source group, wherein the operator multiplies color components of each pixel of the corresponding individual image by a scaling factor;
- generate a value for the light source or light source group based on the applied operator by scaling an initial value of the light source or light source group by the scaling factor; and
- provide the generated value to a design session in a modeling environment.

20. The non-transitory computer readable medium of claim 19, wherein the instructions, when executed, are further operable to:
- import information for the scene from the design session, the information to include an imported value that serves as the initial value of the light source or light source group; and
- use the information to render the stack of individual images.

* * * * *